Patented Aug. 14, 1923.

1,464,627

UNITED STATES PATENT OFFICE.

JOHN W. RUWE, OF SAN ANTONIO, TEXAS.

PROCESS FOR REFINING AND PURIFYING ANIMAL TALLOWS, OILS, FATS, AND GREASES.

No Drawing.  Application filed December 20, 1919. Serial No. 346,358.

*To all whom it may concern:*

Be it known that I, JOHN R. RUWE, a citizen of the United States, residing at 511 West Russell Street, San Antonio, in the county of Bexar and State of Texas, have invented certain new and useful Improvements in Processes for Refining and Purifying Animal Tallows, Oils, Fats, and Greases, of which the following is a specification.

This invention relates to a process for refining and purifying animal tallow fats and greases.

Prior to my invention animal fats have been refined by heating the fat to the melting point (approximately 115° F.) and adding a caustic soda solution. This method has not been satisfactory. At the melting point of the fat the caustic soda solution combines too readily with the free fatty acids and semi-saponifies some of the neutral fat producing a grainy oily soap stock. This also precipitates neutral fat with the soap stock and reduces the percentage of yield. Furthermore, it appears impossible by this method to obtain a definite line of separation between the free fatty acids with impurities (soap stock) and the neutral fats. This is apparently due to the formation of sodium albuminate by the action of the caustic soda solution on the albumin content of the animal fat. The sodium albuminate is in the nature of a liquid soap and remains in suspension. This liquid soap clouds the line of separation between the neutral fats and the soap stock, permeates the neutral fats, and prevents an economic and perfect separation of the neutral fats and soap stock, even though it is contrarily allowed to settle six to eight hours.

The difficulty had with the above method of refining animal fats has resulted in the production of impure neutral fats, a great refining loss, more time consumed and a consequent cost of production and high price to the consumer.

The principal object of my invention is to provide an economic method of refining animal fats.

Another object of my invention is to provide a method of refining animal fats whereby a pure neutral fat will be obtained.

I have discovered that the phenomena that the difficulties in refining animal fats by the above method may be eliminated by the presence of a vegetable oil during the refining operation. If a quantity of crude vegetable oil, such as cotton seed oil, peanut oil, soya bean oil, sesame oil, coconut oil, rape seed oil, or the like be mixed with the animal fat, and the two refined together, a clear and definite line of separation between the neutral fats and soap stock is obtained, and the resultant neutral fat is free of the large percentage of impurities heretofore contended with. The presence of a vegetable oil during the refining of the animal fat reduces the melting point of the mixture and thereby obviates the combination of the caustic soda solution too readily with the free fatty acids and the semi-saponification of neutral fat that occurs at higher temperatures. During the refining operation the free fatty acids and albuminous matter contained in the animal fats and free fatty acids contained in the crude vegetable oils gradually combine with the caustic soda solution and produce a clear and positive separation of the free fatty acids and albuminous matter, which readily and quickly settle out as a soap stock of plastic coherent nature. This formation of a plastic coherent soap stock from the mixture of the animal fat and vegetable oil causes a clear-cut line of separation between the neutral fats and the soap stock, thus preventing the entraining of neutral fat in the soap stock and thereby materially reducing the refining loss. This result is highly advantageous in contradistinction to the indefinite zone of separation between neutral fats and soap stock heretofore experienced in the refining of animal fats. Because of the clear-cut separation of the neutral fats and soap stock produced by following my invention, it is possible to obtain a resultant neutral fat product much purer and more stable than that heretofore obtained by refining animal fats. It is possible with my process to draw off the neutral fats within two hours after refining.

In using my invention those skilled in the art should maintain the same relative proportion of constituents as they have utilized heretofore in refining. In refining with caustic soda sufficient caustic soda solution should be added to combine with the free fatty acids thereby producing a complete and positive separation of the free fatty acids and impurities contained in said mixture. Refining operators are aware that within certain limits the precise proportion of caustic soda solution to free fatty acids is a matter of individual choice and the same latitude applies with my method. I have found that the proportion of animal fat to vegetable oil is not critical with my invention. If too small a percentage of vegetable oil is employed the effect will be negligible. Less than 3% vegetable oil will be of little practical benefit. There is no maximum limit to the percentage of vegetable oil employed. A valuable commercial feature of my invention is the possibility of utilizing a large proportion of vegetable oil when the same is cheap relative to animal fats, and vice versa.

In practicing my invention I have obtained good results by employing animal fats and vegetable oil in proportions of 7 to 3. The mixture is placed in a refining tank and heated to 80°–110° F. While agitating the melted mixture the liquid caustic soda solution is added. (For example:— if the mixture shows 3% free fatty acid use .6% of 18° Bé. lye). After the caustic soda solution has combined with the free fatty acid and albuminous matter, the temperature is gradually raised from 20°–40° F. to effect a complete separation. Thereupon the agitation is stopped and the soap stock permitted to settle. The neutral material may then be drawn off.

My invention pertains primarily to the discovery that an economical and proper refining of animal fats may be accomplished by employing the presence of vegetable oils. To those skilled in the art it will be clear that various minor changes may be made in the process outlined herein without departing from my invention.

I claim:

1. A process of refining animal fat, comprising mixing with animal fat a vegetable oil, heating the mixture below the melting point of the animal fat when free from the vegetable oil, adding sufficient caustic soda solution to combine with the free fatty acid but not such a solution as would saponify the neutral fat, allowing the mass to stand until the neutral fat and soap stock stratify, and separating the neutral fat from the mass.

2. A process of refining animal fat comprising heating a mixture of animal fat and crude vegetable oil to approximately 80 to 110° F., adding caustic soda solution, increasing the temperature approximately 20 to 40° F., and allowing the mixture to stand.

3. A process of refining animal fat which consists in heating a mixture of animal fat and vegetable oil to approximately 80 to 110° F., adding sufficient caustic soda solution to neutralize the free fatty acid but not such a quantity of said solution as would saponify the neutral fat, increasing the temperature approximately 20 to 40° F., and permitting the mixture to stand until stratification takes place.

4. A process of refining animal fat comprising mixing with an animal fat a vegetable oil, adding sufficient caustic solution to combine with the free fatty acids, allowing the mixture to stand until the neutral fat is separated from the soap stock and withdrawing the neutral fat from said soap stock.

5. In a process for refining animal oils for production of a neutral fat, lowering the melting point of animal fat by mixing therewith a vegetable oil, heating the mixture to temperature lower than the melting temperature of the free animal fat, adding sufficient caustic soda solution to combine with the free fatty acids present but not such a quantity as would saponify the neutral fat, and separating the neutral fat from the mass.

In testimony whereof I affix my signature.

JOHN W. RUWE.